No. 894,786.

PATENTED JULY 28, 1908.

L. E. WATERMAN.
POLE SUPPORT.
APPLICATION FILED JAN. 7, 1908.

Witnesses
Edwin L. Bradford.
E. Behel.

Inventor
Lewis E. Waterman
By  A. O. Behel
Attorney

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

POLE-SUPPORT.

No. 894,786.  Specification of Letters Patent.  Patented July 28, 1908.

Application filed January 7, 1908. Serial No. 409,689.

*To all whom it may concern:*

Be it known that I, LEWIS E. WATERMAN, a citizen of the United States, residing at Rockford, in the county of Winnebago and State of Illinois, have invented certain new and useful Improvements in Pole-Supports, of which the following is a specification.

The object of this invention is to support the pole of a harrow or other agricultural implement to relieve the weight on the horses' necks.

In the accompanying drawings. Figure 1 is a perspective view of my improved pole support. Fig. 2 is a vertical section.

The axle 1 is supported by two wheels 2 one being removed to more clearly show the other parts. To the axle about the center of its length is secured a circular enlargement 3 by a set-screw 4. A bracket 5 comprising the forks 6 and 7, and each fork formed with a vertically arranged slot 8 is supported by the axle 1 passing through the slots. This bracket rests on the circular enlargement 3. To the upper end of the bracket 5 is secured a rod 9, and from the bracket extends an ear 10. To the ear 10 of the bracket 5 is connected a bar 11 which extends upward and has its upper end 12 turned over the upper end of the rod 9. To the bar 11 is pivoted a tongue 19 by the plates 13, and an evener support 14 is also connected to the bar.

A pole 15 of a harrow or other agricultural implement has a bracket 16 secured to its forward end which is provided with a vertical opening through which the rod 9 extends. A collar 17 is connected to the rod 9 by the set-screw 18 and is located beneath the bracket 16, and serves to support the forward end of the pole 15.

The team is attached to the evener support 14 and will draw on the bar 11, and through it on the rod 9 and pole 15. The team in turning, will move the tongue 19 laterally, which through its connection with the bar 11 and the connection of the bar 11 with the bracket 5 will turn the bracket, which in turn will turn the axle and supporting wheels, the rod 9 acting as a pivot in its engagement with the bracket 16. Should either supporting wheel ride over an obstruction, the axle 1 will oscillate in a vertical plane and be guided by the slots 8 in the forks 6 and 7 of the bracket 5.

I claim as my invention.

1. A pole support comprising an axle, wheels supporting the axle, a curved enlargement connected to the axle, a bracket provided with depending forks, each having a vertical slot through which the axle passes, the bracket resting on the enlargement, a pole bracket, a rod passing through the pole bracket and connected with the axle bracket, a bar connected with the axle bracket and with the rod, and a tongue connected with the bar.

2. A pole support comprising an axle, wheels supporting the axle, a curved enlargement connected to the axle, a bracket provided with depending forks, each having a vertical slot through which the axle passes, the bracket resting on the enlargement, a pole bracket, a rod passing through the pole bracket and connected with the axle bracket, a bar connected with the axle bracket and with the rod, a tongue connected with the bar, and an evener support connected with the bar.

In testimony whereof I have hereunto set my hand in presence of two subscribing witnesses.

LEWIS E. WATERMAN.

Witnesses:
A. O. BEHEL,
E. D. E. N. BEHEL.